(12) United States Patent
Salomon (10) Patent No.: US 11,738,497 B2
(45) Date of Patent: Aug. 29, 2023

(54) DEVICE FOR FEEDING PREFORMS HAVING VARIABLE-POSITION GUIDE ELEMENTS

(71) Applicant: SIDEL PARTICIPATIONS, Octeville-sur-Mer (FR)

(72) Inventor: Gautier Salomon, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 264 days.

(21) Appl. No.: 17/267,252

(22) PCT Filed: Jul. 23, 2019

(86) PCT No.: PCT/FR2019/051828
§ 371 (c)(1),
(2) Date: Feb. 9, 2021

(87) PCT Pub. No.: WO2020/030865
PCT Pub. Date: Feb. 13, 2020

(65) Prior Publication Data
US 2021/0162647 A1 Jun. 3, 2021

(30) Foreign Application Priority Data
Aug. 9, 2018 (FR) ...................................... 1857416

(51) Int. Cl.
*B29C 49/42* (2006.01)
*B65G 17/12* (2006.01)
(Continued)

(52) U.S. Cl.
CPC .......... *B29C 49/4205* (2013.01); *B65G 17/12* (2013.01); *B29C 49/42057* (2022.05); *B29K 2067/003* (2013.01); *B29L 2031/712* (2013.01)

(58) Field of Classification Search
CPC ................ B29C 49/4205; B65G 17/12; B65G 21/2072; B65G 2201/0244; B65G 2201/0247; B29K 67/00; B29L 31/00
(Continued)

(56) References Cited

U.S. PATENT DOCUMENTS

| 6,368,027 | B1 * | 4/2002 | Trenel | B65G 51/035 406/87 |
| 7,556,137 | B2 * | 7/2009 | Charpentier | B29C 49/4205 198/395 |

(Continued)

FOREIGN PATENT DOCUMENTS

| EP | 1335870 A1 | 8/2003 | |
| EP | 3093259 | * 11/2016 | ............. B65G 51/03 |

(Continued)

OTHER PUBLICATIONS

International search report dated Nov. 13, 2019.

*Primary Examiner* — James R Bidwell (57) ABSTRACT

The invention includes a device for supplying preforms having a collar. The device comprising a file-forming slide for the preforms, and the slide comprises a fixed frame and elements for guiding the preforms. The guiding elements are mounted so as to be adjustable in terms of position on the frame so as to be adapted to different formats of preform. The frame comprises support plates that are fixed in a reference position on the frame by removable fastening means, the guiding elements being mounted so as to be adjustable on the support plates.

20 Claims, 7 Drawing Sheets

(51) Int. Cl.
*B29K 67/00* (2006.01)
*B29L 31/00* (2006.01)

(58) Field of Classification Search
USPC ...................................................... 198/836.3
See application file for complete search history.

(56) References Cited

U.S. PATENT DOCUMENTS

| | | | | |
|---|---|---|---|---|
| 8,851,806 | B2* | 10/2014 | Beutl | B65G 51/03 |
| | | | | 406/88 |
| 2011/0198270 | A1* | 8/2011 | Beutl | B29C 49/4205 |
| | | | | 209/552 |
| 2015/0101909 | A1 | 4/2015 | Tanner | |

FOREIGN PATENT DOCUMENTS

| | | | | |
|---|---|---|---|---|
| FR | 3037329 | * | 12/2016 | ......... B65G 21/2072 |
| WO | 2011/029949 | * | 3/2011 | ............. B65G 51/03 |

* cited by examiner

DEVICE FOR FEEDING PREFORMS HAVING VARIABLE-POSITION GUIDE ELEMENTS

TECHNICAL FIELD OF THE INVENTION

The invention relates to a device for supplying preforms, in particular preforms made of thermoplastic material intended to be shaped into containers, suitable for preforms comprising a collar, the device comprising a file-forming slide for the preforms, comprising two sliding tracks intended to support the preforms upright by their collar, the slide comprising:

a fixed frame;

elements for guiding the preforms, which elements are mounted so as to be adjustable in terms of position on the frame so as to be adapted to different formats of preform.

TECHNICAL BACKGROUND OF THE INVENTION

The supply device is designed to be implemented in an installation for blow-molding of containers made of thermoplastic material, such as polyethylene terephthalate (PET).

According to a well-known technique, containers of this kind are produced in two main steps. A first step involves injection molding of a preform made of thermoplastic material. This preform comprises an essentially tubular body which is closed at one of its axial ends. Once this injection molding operation has been completed, the other end of the preform has the final shape of the neck of the container. Generally, the neck of the container comprises a thread and, at its base, an annular support collar which projects radially outward relative to the neck and relative to the neck.

There are machines in which the preforms are sent directly to the blow-molding machine just after their injection molding, each preform being transported individually.

However, in numerous cases, the preforms are manufactured by injection molding at a first location and are blow-molded to the definitive shape of the container at a second location on a specific blow-molding machine. A technology of this kind makes it possible to carry out the blow-molding operation as close as possible to the bottling operation, since the injection-molding operation can be done anywhere. Indeed, it is relatively easy and cheap to transport preforms, whereas transportation of the containers after blow-molding has the drawback of being relatively uneconomical owing to the very large volume of the containers.

In the event that the injection molding machine and the blow-molding machine are two completely independent machines, the blow-molding machine has a preform supply device which is equipped with a system for sorting and aligning the preforms.

In such a system, the preforms are deposited in bulk into a trough. They are removed from this trough by an elevator belt which in turn deposits the preforms, at a predetermined rate, onto the upper end of orienting rollers, also termed aligning rollers. These two aligning rollers are inclined relative to the horizontal and they are essentially parallel to one another. The two rollers are driven in rotation in opposite directions, and are spaced apart from one another so as to leave a gap which is slightly larger than the diameter of the body of the preforms, but slightly smaller than the outer diameter of the support collar located at the base of the neck.

The orienting rollers are configured in such a way that, under the effect of gravity, the preforms are forced between the two rollers. Thus, simply by gravity, each preform tends to arrange itself between the two rollers, so as to be suspended by its collar between the rollers. The counter-rotation of the two rollers ensures that the preforms are positioned upright one behind the other, and the inclination of the rollers ensures that the preforms slide along the axis of the rollers, toward the bottom of the orienting rollers, where they are then recovered in a file-forming slide, which is itself connected to the blowing installation.

The file-forming slide for the preforms comprises a longitudinal slot which is bounded transversely by two parallel rails.

In the file-forming slide, the preforms accumulate in a continuous line. Normally, each preform tends to arrange itself upright in the slide, between the two parallel rails, in such a way that it is suspended by its collar on the rails.

The file-forming slide is configured in such a way that only perfectly positioned preforms are allowed to slide downward. To that end, the rails of the slide comprise numerous guiding elements which serve to ensure that only correctly positioned preforms can file along. Moreover, these guiding elements serve to guarantee that the preforms that have been received in the slide retain correct positioning until they arrive at the bottom of the slide.

To that end, the various guiding elements must be perfectly adjusted to the dimensions of the preform.

The installations for producing containers are designed to be able to receive preforms of different formats. To that end, the guiding elements are mounted so as to be adjustable in terms of position on the slide. In the case of a change of preform format, it is necessary to carry out numerous adjustments, in particular in order to make it possible to adjust the guiding elements to the dimensions of the new model of preform.

Such an adjustment operation is generally very time-consuming. Moreover, an adjustment error can result in stoppage of the installation for the time that it takes to rectify the position of the various guiding elements.

BRIEF SUMMARY OF THE INVENTION

The invention proposes a device for supplying preforms, in particular preforms made of thermoplastic material intended to be shaped into containers, suitable for preforms comprising a collar, the device comprising a file-forming slide for the preforms, comprising two sliding tracks intended to support the preforms upright by their collar, the slide comprising:

a fixed frame;

elements for guiding the preforms, which elements are mounted so as to be adjustable in terms of position on the frame so as to be adapted to different formats of preform;

wherein the guiding elements are mounted so as to be adjustable on the frame by means of associated support plates, the support plates being fixed in a reference position on the frame by removable fastening means in order that the guiding elements can be detached from the frame by removing the support plates while keeping their adjustment in terms of position relative to the support plates.

According to other features of the invention:

the means for removable fastening of the support plates on the frame consist of quick-release fasteners;

the slide comprises a slot bounded transversely by two parallel guiding rails, each guiding rail comprising an under-neck guide, forming one of said guiding elements, which comprises one of the tracks for sliding, the under-neck guide being mounted so as to be adjustable transversely on the support plate by means of first adjustable fastening means;

each guiding rail comprises a body guide, forming one of said guiding elements, which is arranged below the under-neck guide in order to guide a body of the preforms and which is mounted so as to be adjustable transversely on the under-neck guide by means of second adjustable fastening means;

each guiding rail comprises a neck guide, forming one of said guiding elements, which is arranged on the under-neck guide in order to guide a neck of the preforms and which is mounted so as to be adjustable transversely on the under-neck guide by means of third fastening means;

the device also comprises at least one lip guide, forming one of said guiding elements, which is arranged in line with the slide in order to hold the preforms upright in the slide, the lip guide being mounted so as to be adjustable vertically on support plates by means of fourth adjustable fastening means, the support plates being fastened in a reference position on the frame by means of quick-release fasteners;

the quick-release fasteners are formed by nesting of complementary-shaped elements, comprising a ball locking mechanism;

the ball locking mechanism comprises a pusher for unlocking;

the quick-release fasteners are formed by ball-and-socket mechanisms;

at least one of the adjustable fastening means is formed by a clamping screw received in an adjustment port, the clamping screw comprising an imprint for cooperating with an adjustment key;

each guiding rail is formed of multiple independent segments which are each borne by associated support plates.

BRIEF DESCRIPTION OF THE FIGURES

Further features and advantages of the invention will become apparent from reading the following detailed description, for the understanding of which reference will be made to the appended drawings, in which.

DETAILED DESCRIPTION OF THE FIGURES

In the rest of the description, elements that have an identical structure or similar function will be denoted by one and the same reference.

In the rest of the description, the orientations longitudinal, vertical and transverse will be adopted in a nonlimiting manner, these orientations being indicated by the trihedron "L, V, T" in the figures. In this case, the vertical direction is used by way of a geometric reference oriented perpendicular to the longitudinal axis of the file-forming slide. The direction of gravity is indicated by the arrow "G" of FIG. 1. As indicated at the start of the description, since the slide is inclined at a given angle to a horizontal plane, the vertical direction is in this case inclined at the same angle to the direction of gravity.

In the rest of the description, the term 'interior' will be used to qualify a face or a displacement directed transversely toward the central slot 27 of the file-forming slide 16, while the term 'exterior' will refer to an opposite direction.

Figures 1, 2:
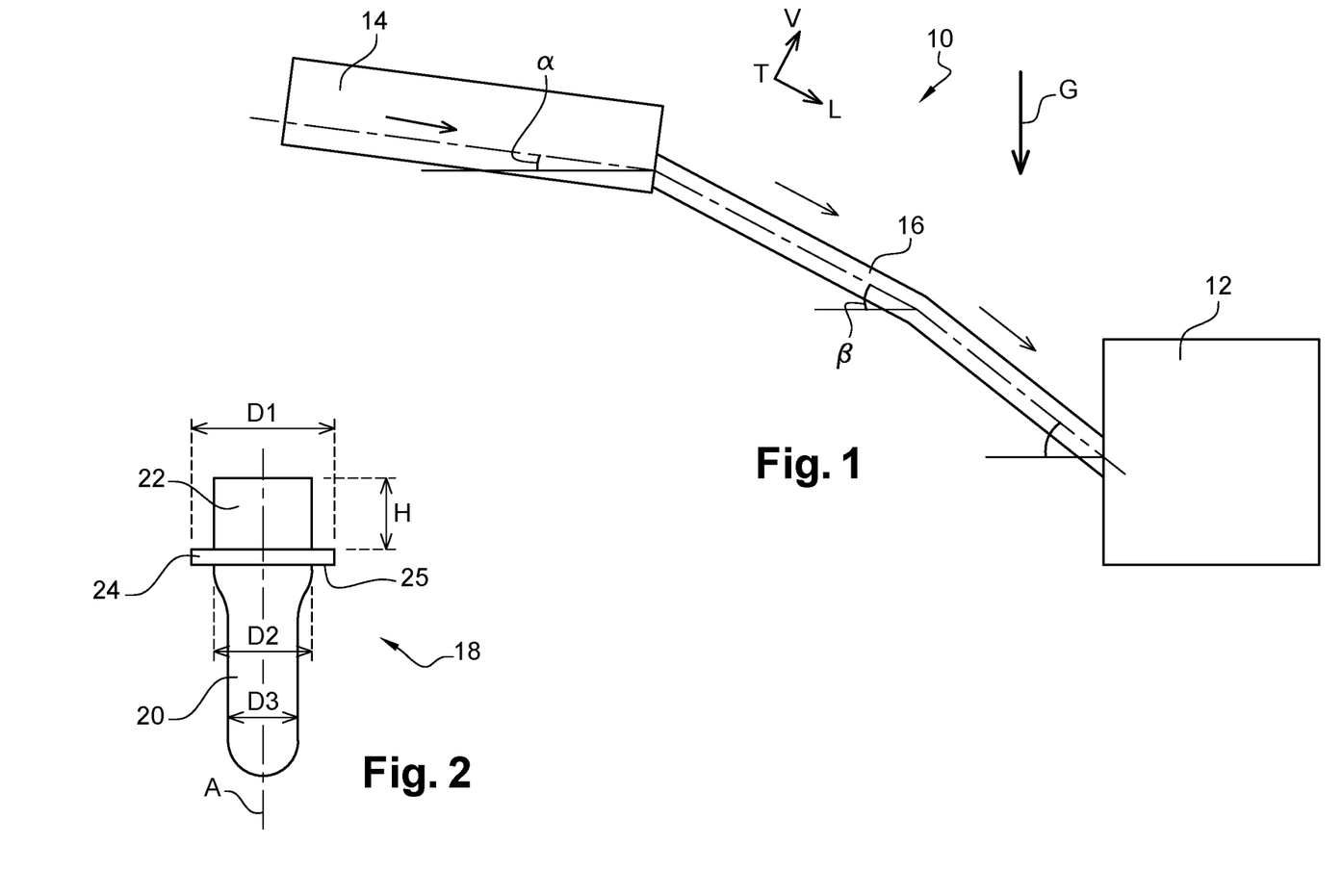
FIG. 1 is a schematic view in profile which shows a preform supply device comprising a file-forming slide that is created according to the teaching of the invention.
FIG. 2 is a schematic view in profile which shows a preform that can be taken on by the supply device of FIG. 1.

FIG. 1 shows, very schematically, a preform supplying device 10 that is intended for example to supply preforms 18 to a blow-molding installation 12. The supplying device 10 comprises upper orienting rollers 14 between which preforms 18 are deposited in bulk at a rate determined by means which are not shown.

In the orienting rollers 14, the preforms 18 are oriented neck-up and are arranged in a line in order to then be delivered to a file-forming slide 16 which transports the preforms 18 to the blow-molding installation 12. An example of such orienting rollers 14 is described in detail in document EP-A1-1.335.870. Preforms 18 are thus received in the file-forming slide 16.

The orienting rollers 14 have a slope of given inclination "α", for example 12° to the horizontal, to allow the preforms 18 to slide to the entry of the file-forming slide 16 located below under the effect of gravity, while the file-forming slide 16 has a slope "β" of greater inclination, for example 15°.

As shown in FIG. 2, each preform 18 supplied to the blow-molding installation 12 has a tubular body 20 of axis "A" which is closed at its lower end. The body 20 is open axially upward via a cylindrical neck 22 which extends the body 20 upward. Where the neck 22 joins the body 20 there is a collar 24 which projects radially relative to the cylindrical segment of the neck 22 and relative to the body 20. The collar 24 has an annular lower face 25 which has a free outer edge of outer diameter "D1". An internal edge of the face 25 below the intersection with the body 20 has an internal diameter, referred to hereafter as the under-neck diameter "D2". The body 20 further has, at a distance below the collar 24, a diameter "D3". Finally, the neck 22 has a given axial height "H".

Figure 3:
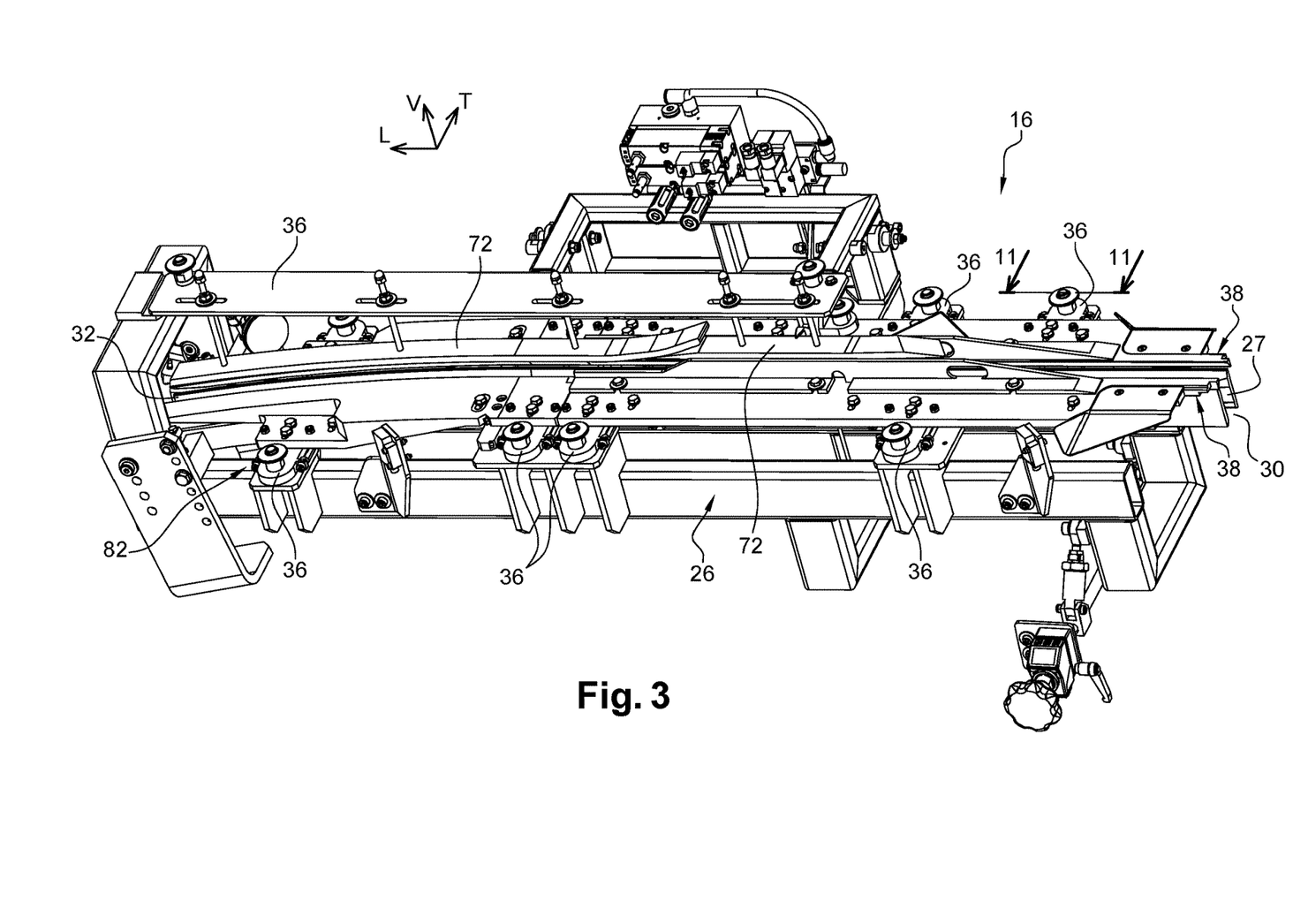
FIG. 3 is a perspective view which shows a supply slide that is created according to the teaching of the invention, wherein the rails for guiding the preforms and the lip guide are mounted on the frame.

The invention relates to the file-forming slide 16 for the preforms 18. As shown in FIG. 3, the file-forming slide 16 comprises a frame 26 that is fixed relative to the ground.

The file-forming slide 16 comprises a longitudinal slot 27 which extends from an entry 30 to an exit 32 of the file-forming slide 16. The exit 32 of the file-forming slide 16 is located below the entry 30 to allow the preforms 18 to slide toward the exit 32 under the effect of gravity.

The slot 27 is bounded transversely by two sliding tracks 34 that are intended to support the upright preform 18 by its collar 24. In particular, the preform 18 is suspended between the two sliding tracks 34 by its collar 24.

The file-forming slide 16 further comprises elements for guiding the preforms 18. As will be explained in greater detail hereafter, the guiding elements are in this case formed by at least one under-neck guide 40 and/or at least one body guide 52 and/or at least one neck guide 62 and/or at least one lip guide 72.

These guiding elements are mounted so as to be adjustable in terms of position on the frame 26 by adjustable fastening means, so as to be adapted to different formats of preform 18. Indeed, it is important that the guiding elements be set as close as possible to the preforms 18 in order to ensure that the preforms 18 adopt a position that is perfectly suited to supplying the blow-molding installation 12 at the exit 32 of the slide 16, and to ensure that the preforms 18 do not become stuck in the slide 16 as they file along.

The adjustment of the position of the various guiding elements must be done with great accuracy in order to avoid preforms becoming stuck as they slide along the guide elements. This operation is extremely time-consuming.

Moreover, it has been noted that numerous manufacturers of containers use a limited number of preforms 18. However, even when adjustment has already been carried out for a given model of preform, it is difficult to return to that adjustment in a repeatable manner.

The invention proposes equipping the file-forming slide 16 with support plates 36 which are fixed in a reference position on associated reference positions 37 of the frame 26. This means that the position of the support plates 36 is not adjustable with respect to the frame 26. This ensures that each support plate 36 occupies said reference position when it is once again mounted on the frame 26 after having been removed.

Each element for guiding the preforms 18 is mounted so as to be adjustable on the frame 26 by means of at least one associated support plate 36. Thus, each support plate 36 is designed to support at least one element for guiding the preforms 18. Each guiding element is fastened so as to be adjustable in terms of position relative to the support plate 36 by associated adjustable fastening means.

In order to permit rapid replacement of the support plates 36 and of the associated guiding elements, each support plate 36 is also fastened to the frame 26 by means of quick-release fasteners 82. These quick-release fasteners 82 are also known as "snap locks". A quick-release fastener 82 of this kind makes it possible to install and remove the support plates 36 with economy of movement and without requiring the use of tools.

Since the guiding elements are fastened to the frame 26 so as to be adjustable, by means of the support plates 36, the guiding elements can be removed from the frame 26 by rapid removal of the support plates 36 while retaining their setting in terms of position relative to the support plates 36 for a specific model of preform 18. When said model of preform 18 is once again processed by the blow-molding installation 12, the guiding elements and their support plate 36 may once again be mounted on the frame 26 with the appropriate setting, without the need for a new adjustment operation.

In the example shown in the figures, the file-forming slide 16 comprises two groups of guiding elements.

Figure 4:
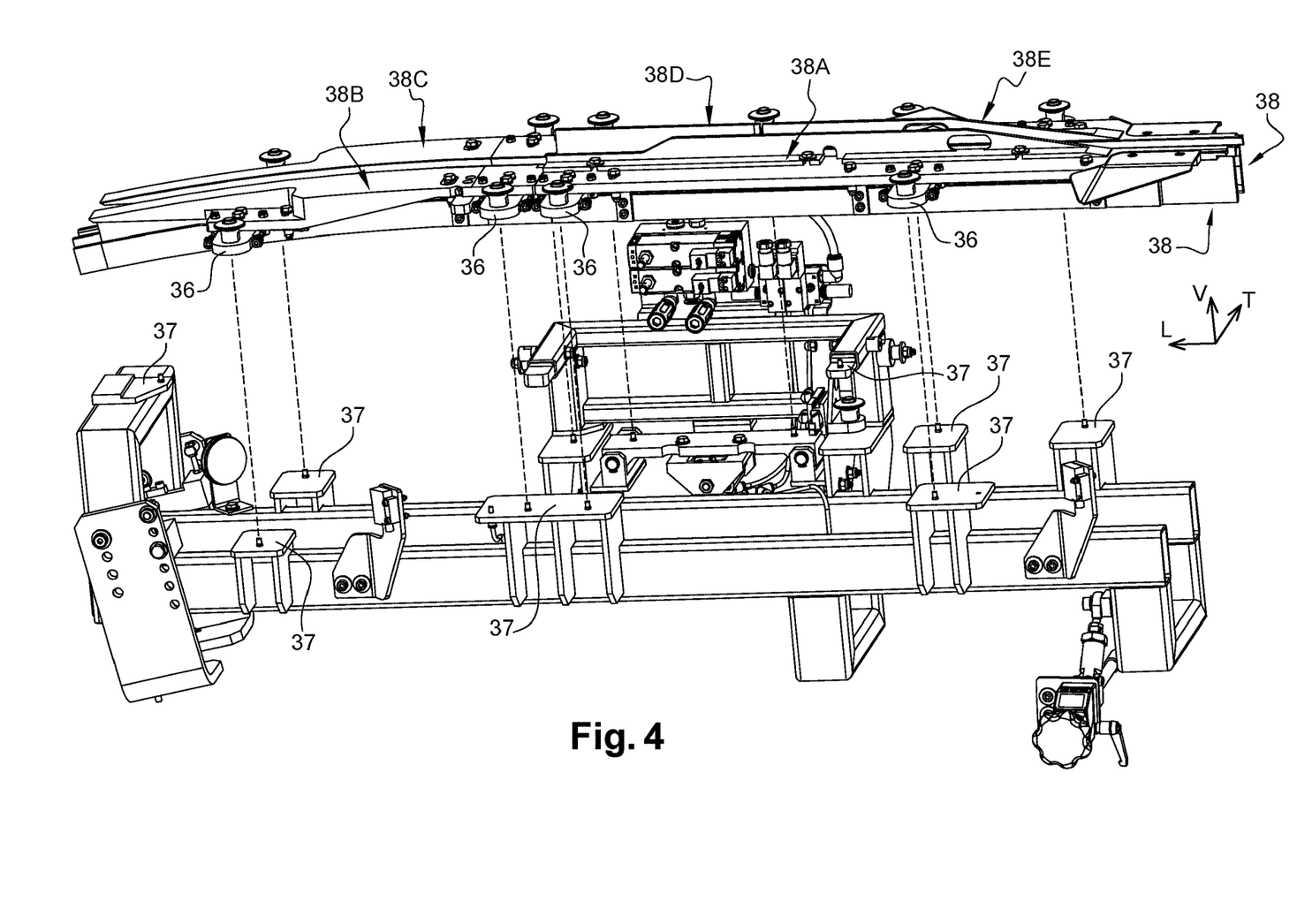
FIG. 4 is a view in perspective similar to that of FIG. 3, in which the lip guide is absent and in which the guiding rails are shown disassembled from the frame.
Figure 5:
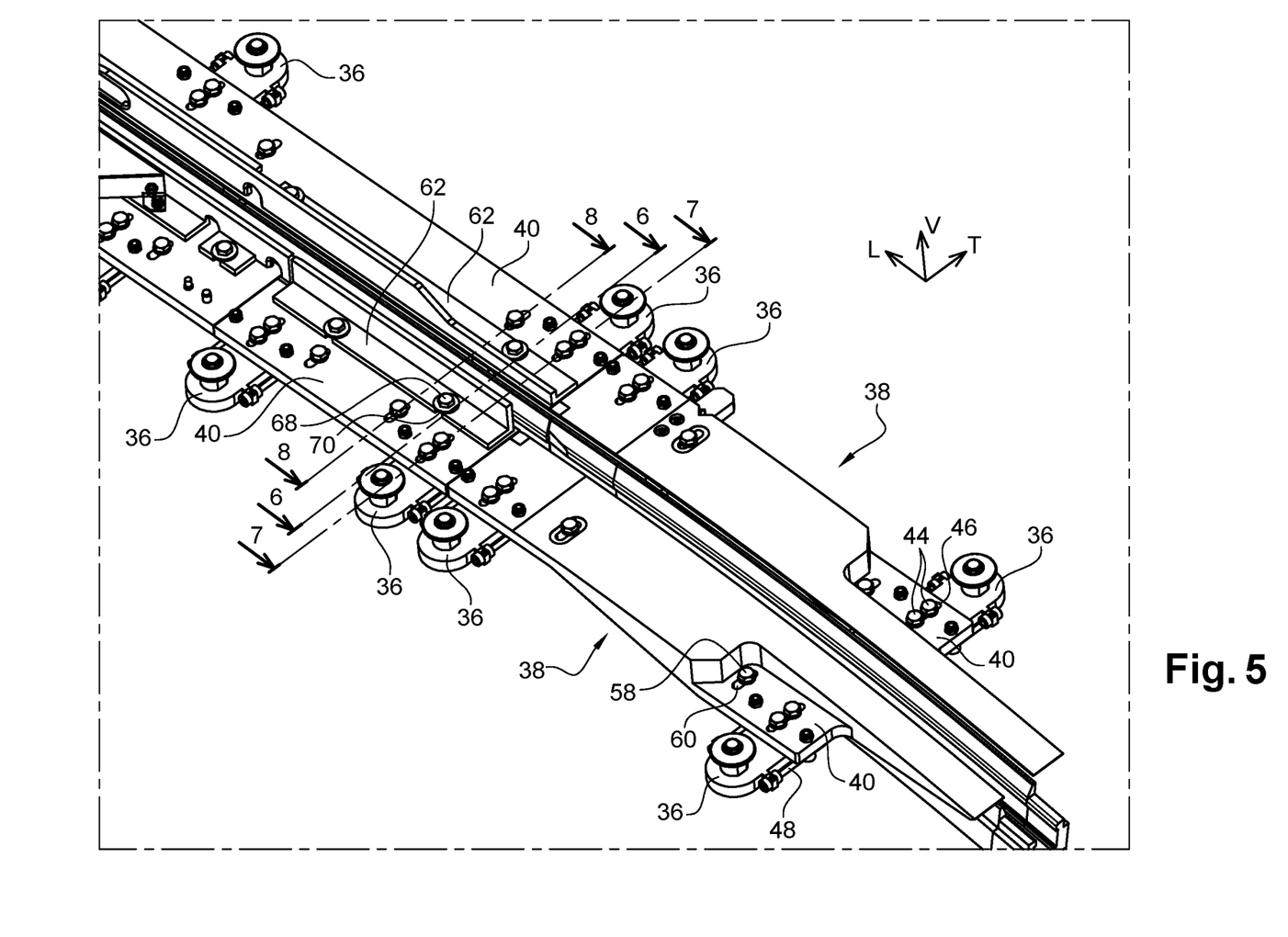
FIG. 5 is a view in perspective from above, which shows the rails for guiding the preforms mounted adjusted in position on their support plates, and which are intended to be mounted on the frame of the file-forming slide.

As shown in FIGS. 4 and 5, a first group of guiding elements is formed by two parallel guiding rails 38 which extend longitudinally on either side of the slot 27.

Figure 6:
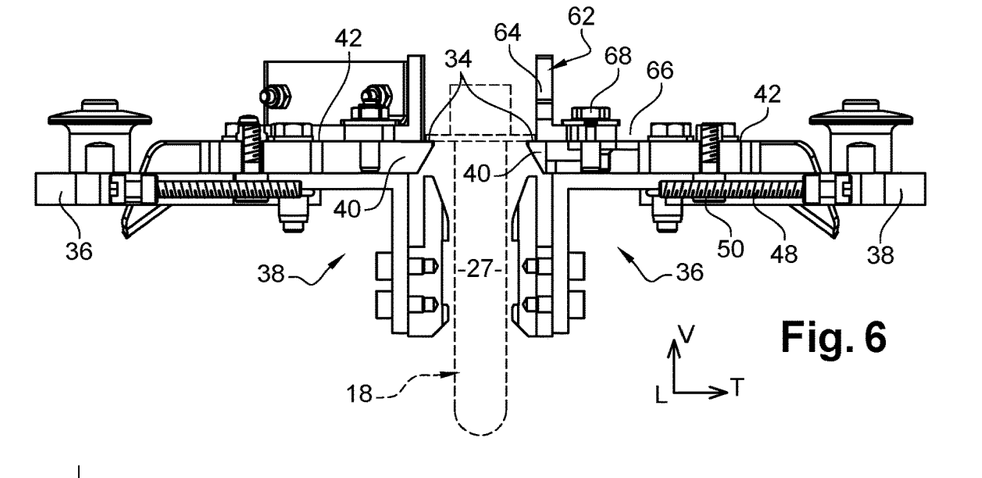
FIG. 6 is a view in vertical cross section along the plane of section 6-6 of FIG. 5.
Figure 7:
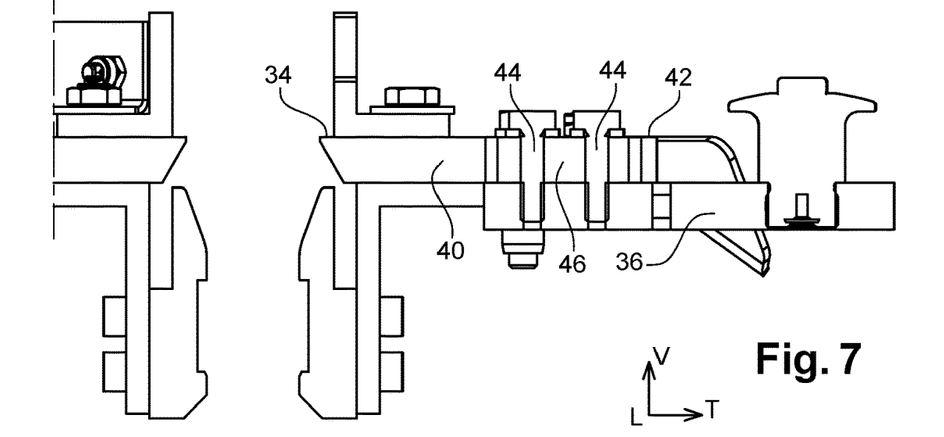
FIG. 7 is a view in vertical cross section along the plane of section 7-7 of FIG. 5.

As is shown in particular in FIGS. 6 and 7, each guiding rail 38 comprises a first guiding element formed by an under-neck guide 40. The under-neck guide 40 takes the form of a horizontal plate. The under-neck guide 40 comprises the sliding track 34 which is formed on an interior longitudinal rim of an upper face 42 of the under-neck guide 40. The sliding track 34 is intended to support the preforms 18 by their collar 24. The under-neck guide 40 is mounted so as to be adjustable transversely on associated support plates 36 by means of first adjustable fastening means. The under-neck guide 40 of each guiding rail 38 is in this case divided in two or three independent segments in order to facilitate the replacement of the guiding rails 38. The two longitudinal ends of each under-neck guide 40 segment are each adjustably fastened to an associated support plate 36.

As is shown in FIGS. 5 and 7, each under-neck guide 40 is more particularly mounted so as to be able to slide transversely on the associated support plates 36 via the intermediary of vertical-axis clamping screws 44 which are received in longitudinal oblong openings 46 of the under-neck guide 40. A free end of the clamping screws 44 is received in a complementary tapping of the support plate 36. Thus, when the clamping screws 44 are loosened, the under-neck guide 40 is liable to slide transversely relative to the clamping screws 44 which are secured in the support plate 36. When the clamping screws 44 are tightened, the under-neck guide 40 is immobilized in its adjusted position by being clamped between a head of the clamping screws 44 and an upper face of the support plate 36.

Moreover, in order to permit very precise setting of the transverse position of the under-neck guide 40 relative to the support plate 36, the support plate 36 comprises an adjustment screw 48 whose axis is transverse to the captive head which is only able to rotate about its axis relative to the support plate 36, as is shown in FIGS. 5 and 6. A threaded shank of the adjustment screw 48 is received in an adjustment nut 50 which moves transversely as one with the under-neck guide 40. Thus, by turning the adjustment screws 48, it is possible to adjust with precision the transverse position of the under-neck guide relative to the support plate 36 when the clamping screws 44 are loosened.

Moreover, the adjustment nut 50 is in this case mounted so as to be adjustable in terms of vertical position relative to the under-neck guide 40 to make it possible to adjust the attitude and altitude of the under-neck guide 40 relative to the support plate 36.

Moreover, each guiding rail 38 also comprises a second guiding element formed by a body guide 52 which is arranged beneath the associated under-neck guide 40. This body guide 52 is intended to avoid the body 20 of the preforms 18 tipping transversely between the guiding rails 38.

In order to make it possible to adapt the width of the transverse space enclosed between two body guides 52 on either side of the slot 27, it is provided to mount the body guide 52 so as to be adjustable transversely on the under-neck guide 40 by means of second adjustable fastening means. Each body guide 52 has a longitudinal vertical guiding panel 54 that extends vertically downward from a lower face of the under-neck guide 40 and a horizontal fastening tab 56 which extends transversely outward from an upper end edge of the guiding panel 54.

Figure 8:
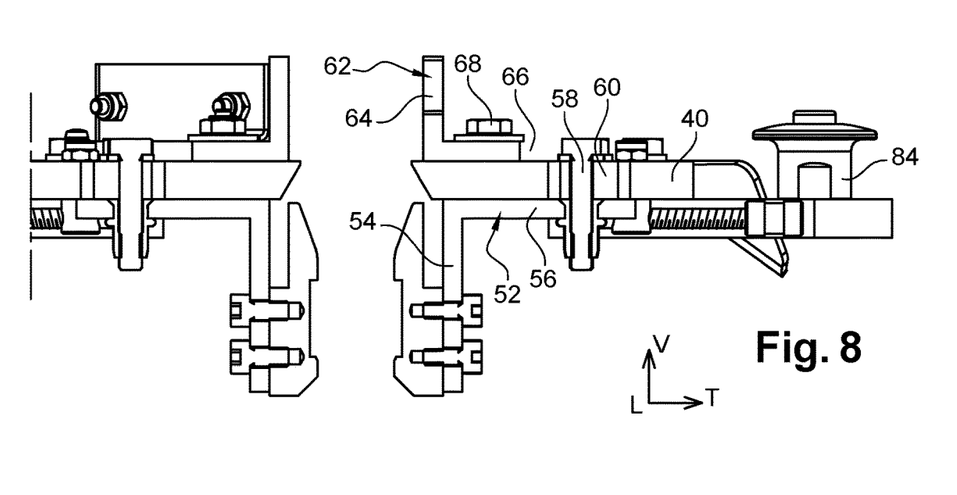
FIG. 8 is a view in vertical cross section along the plane of section 8-8 of FIG. 5.

As is shown in particular in FIGS. 5 and 8, the second adjustable fastening means consist of vertical-axis clamping screws 58 which are received in a transversely extending oblong opening 60 of the under-neck guide 40. A threaded end of the clamping screw 58 is received in an associated tapping of the fastening tab 56 of the body guide 52, while a head of the clamping screw extends above the under-neck guide 40. Thus, the transverse displacement of the body guide 52 relative to the under-neck guide 40 is guided by the transverse sliding of the shank of the clamping screw 58 in the oblong opening 60. When the transverse position of the body guide 52 has been adjusted relative to the under-neck guide 40, the clamping screws 58 are tightened so as to be able to immobilize the body guide 52 in the adjusted position relative to the under-neck guide 40 by clamping between the head of the clamping screw 58 and the fastening tab 56 of the body guide 52.

Each body guide 52 is also divided into two or three segments, each of which is associated with a segment of the under-neck guide 40.

Each guiding rail 38 also comprises a third guiding element formed by a neck guide 62 which is arranged on the under-neck guide 40. The neck guides 62 serve to outwardly transversely delimit the sliding track 34. This makes it possible, in particular, to avoid the preforms 18 moving transversely in the slot 27 as they file along. In this case, the neck guide 62 takes the form of a right-angle comprising a longitudinal vertical guiding flange 64 that extends vertically upward from the sliding track 43, and a lower, horizontal fastening flange 66 that extends transversely towards the outside from the lower edge of the guiding flange 64.

The neck guide 62 is mounted so as to be adjustable transversely on under-neck guide 40 by means of third adjustable fastening means. As is shown in FIG. 5, the third adjustable fastening means consist of vertical-axis clamping screws 68 which are received in an oblong opening 70 of the fastening flange 66 of the neck guide 62. A threaded end of the clamping screw 68 is received in an associated tapping of the under-neck guide 40, while a head of the clamping screw 68 extends above the fastening flange 66 of the neck guide 62. Thus, the transverse displacement of the neck guide 62 relative to the under-neck guide 40 is guided by the transverse sliding of the shank of the clamping screw 68 in the oblong opening 70. When the transverse position of the neck guide 62 has been adjusted relative to the under-neck guide 40, the clamping screws 68 are tightened so as to be able to immobilize the neck guide 62 in the adjusted position relative to the under-neck guide 40 by clamping the fastening flange 66 of the neck guide 62 between the head of the clamping screw 68 and the under-neck guide 40.

Each neck guide 62 is also divided into two or three segments, each of which is associated with a segment of the under-neck guide 40.

As shown in FIG. 4, one of the guiding rails 38 is therefore formed of two independent segments 38A, 38B while the other guiding rail 38 is formed of three independent segments 38C, 38D, 38E. Each segment 38A to 38E is borne by two associated support plates 36 arranged at its longitudinal ends. This makes it possible to simplify the handling of the support elements upon a change of preform 18, as will be explained below.

Figure 9:
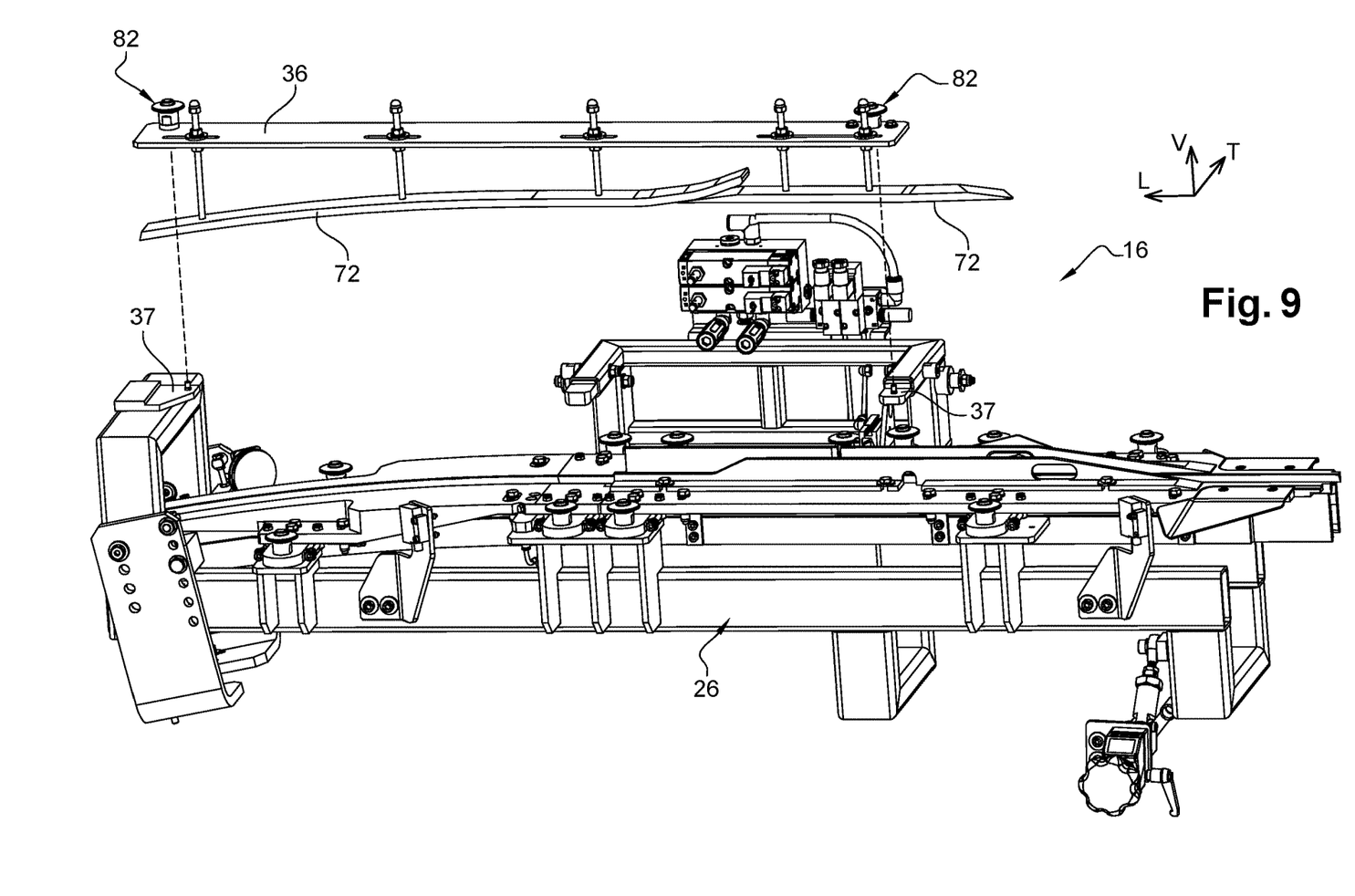
FIG. 9 is a view similar to that of FIG. 4, which shows the lip guide disassembled from the frame, the guiding rails being mounted on the frame.
Figures 10, 11:
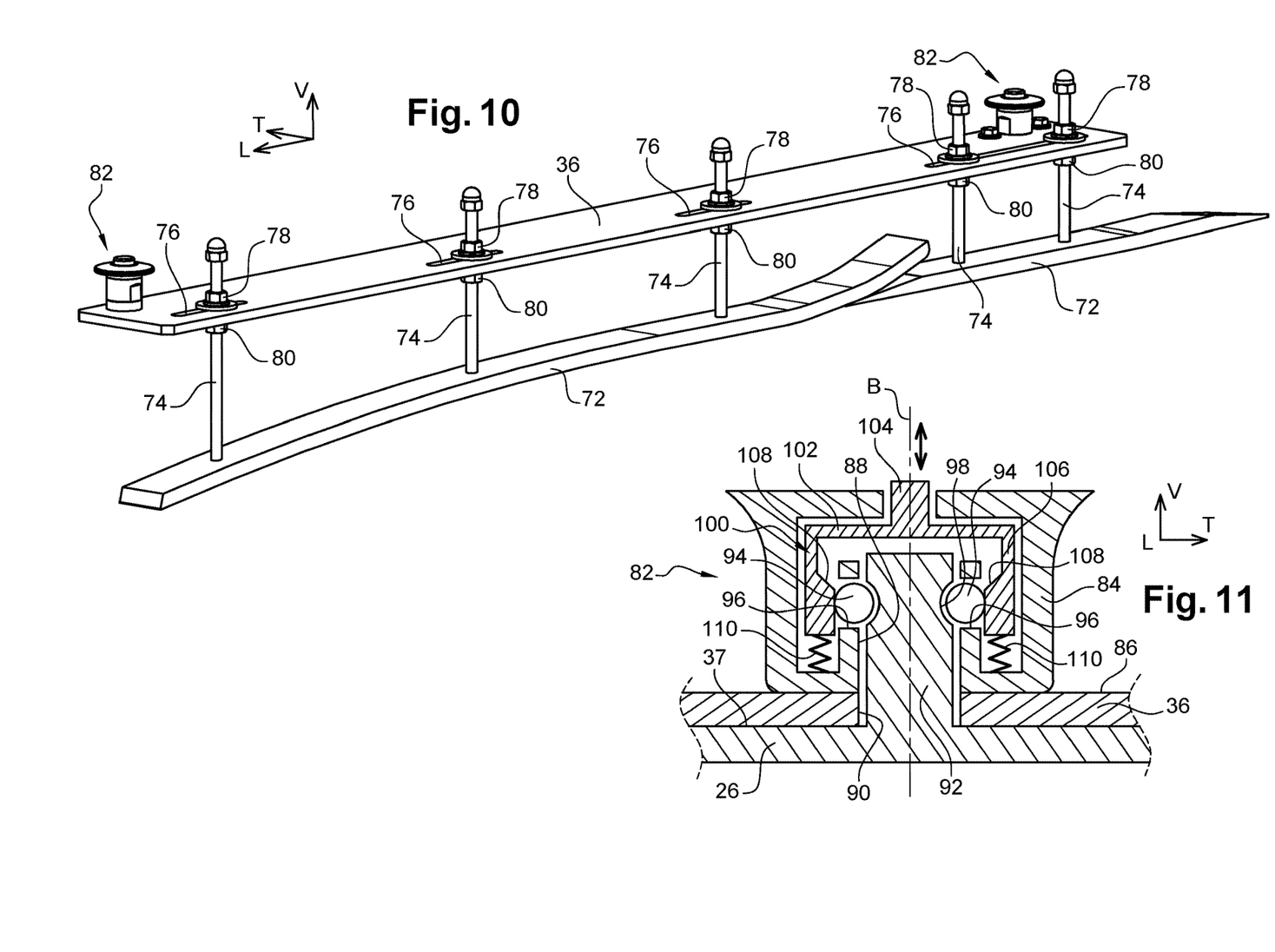
FIG. 10 is a view in perspective, which shows the lip guide mounted adjusted in position on its support plates, and which is intended to be mounted on the frame of the file-forming slide.
FIG. 11 is a view in axial section along the plane of section 11-11 of FIG. 3, which shows the quick-release fasteners of the plates in the position mounted on the frame.

A second group of guiding elements is formed by at least one lip guide 72. As shown in FIGS. 9 and 10, the lip guide 72 is formed by a transverse longitudinal guiding plate which is arranged in line with the file-forming slide 16 in order to hold the necks 22 of the preforms 18 upright in the file-forming slide 16. The lip guide 72 is mounted so as to be adjustable vertically on the frame 26 by means of fourth adjustable fastening means. This makes it possible to adapt the height of the lip guide 72 relative to the height "H" of the neck 22 such that the lip guide 72 is positioned as close as possible to the upper end of the neck 22 of the preforms 18 while allowing them to file along.

The lip guide 72 is mounted on the frame 26 via the intermediary of an associated support plate 36 so as to make it possible to detach the lip guide 72 from the frame 26 by rapid removal of the support plate 36 while retaining its position setting relative to the support plates 36.

More particularly, the support plate 36 is formed by a longitudinal vertical plate which is arranged at a distance above the guiding rails 38. To that end, the support plate 36 rests in this case on placements 37 that are arranged at height relative to the reference placements 37 of the support plates 36 of the guiding rail 38.

The lip guide 72 is mounted so as to be adjustable vertically between the support plate 36 and the guiding rails 38 by means of suspension rods 74 which are received in orifices 76 of the support plate 36. A lower end of the suspension rods 74 is fastened to the lip guide 72 while an upper end of the suspension rods 74, projecting above the support plate 36, is provided with a nut 78 that serves for adjusting the height of the lip guide 72. A counter-nut 80, located just below the support plate 36, serves for vertically immobilizing the lip guide 72 relative to the support plate 36 by clamping when the lip guide 72 is adjusted in terms of position.

Moreover, the lip guide 72 is adjustable in terms of longitudinal position relative to the support plate 36. To that end, the orifices 76 of the support plate 36 have a longitudinally elongate shape to make it possible to guide the lip guide 72 to slide longitudinally relative to the support plate 36.

All of the support plates 36 are removably fastened to the frame 26 using quick-release fasteners 82. Each support plate 36 for a segment of guiding rail 38 comprises in this case a single quick-release fastener 82, while the support plate 36 for the lip guide 72 has in this case two quick-release fasteners 82, each arranged at one longitudinal end of the support plate 36.

According to the non-limiting example shown in FIG. 11, the quick-release fasteners 82 consist of axial nesting means provided with a ball locking mechanism. The quick-release fasteners 82 comprise a first part that is borne by the support plate 36 and a second part that is borne by the frame 26.

The first part of the quick-release fastener 82 comprises a sleeve 84 of vertical axis "B" which forms a female nesting element. The sleeve 84 is fastened to an upper face 86 of the support plate 36. Advantageously, the sleeve 84 forms a handle by means of which handling and positioning of the guiding elements on the frame 26 can be facilitated.

The sleeve 84 has a central orifice 88 which is arranged so as to coincide with an orifice 90 of the support plate 36. The frame 26 comprises a vertical-axis pin 92 which projects vertically upward relative to the reference placement 37. The pin 92 forms a male element that is intended to be nested vertically in the central orifice 88 of the sleeve 84, passing through the orifice 90 of the support plate 36 when the latter is placed on the reference placement 37.

This nesting is adjusted so that the support plate 36 can be immobilized radially in all directions relative to the frame 26, while allowing the support plate 36 to slide vertically.

In order to vertically lock the sleeve 84 in the position where it is nested with the pin 92, the sleeve 84 is fitted with locking balls 94 which are received so as to be able to move radially in recesses 96 created in the internal cylindrical wall that delimits the central orifice 88 of the sleeve 84. The recesses 96 open radially toward the vertical axis of the sleeve 84. The recesses 96 are designed in such a way that they hold the balls 94 captive while allowing them to move radially between a release position in which the balls 94 are entirely retracted in their recess 96 and a locking position in which the balls are pushed radially inward so that they project from the cylindrical wall of the central orifice 88 through the openings of the recesses 96.

The pin 92 comprises a channel 98 that receives the balls 94 in their locking position in order to lock the sleeve 84 in the nested position.

The sleeve 84 further comprises means for controlling the balls, these being formed by a pusher 100 that is mounted so as to be able to slide vertically in the wall of the sleeve 84. The pusher 100 has an upper horizontal core 102 which comprises, on its upper face, a central actuating button 104 that is accessible from the top of the sleeve 84 via a hole.

Vertical tabs 106 extend vertically downward from a peripheral edge of the core 102. A free lower end of the tabs 106 is provided with a ramp 108 for controlling the balls 94. These ramps 108 are arranged in a bottom of the recesses 96. When the pusher is controlled in an upper position, the balls 94 are constrained by the ramps 108 toward their locking position, whereas when the pusher 100 is ordered into a lower position, the ramps 108 allow the balls 94 to slide toward their release position.

The pusher 100 is in this case returned to its upper locking position by an elastic member 110 which is interposed vertically between a face of the sleeve 84 and the lower end of the tabs 106. The button 104 of the pusher 100 must be actuated so as to order the balls 94 into their release position.

According to one variant (not shown) of the invention, the pin is borne by the support plate, whereas the sleeve is borne by the frame.

According to another variant of the invention, the ball locking mechanism is borne by the pin rather than by the sleeve.

According to another variant of the invention, the balls can be replaced with other locking elements such as lugs.

According to one variant (not shown) of the invention, the quick-release fasteners consist are formed by ball-and-socket mechanisms.

When the file-forming slide 16 is first used with a new model of preform 18 that is to be processed recurrently, the guide rails 38 and the lip guide 72 are fastened to the frame 26 via the associated support plates 36 using the quick-release fasteners 82. The axial nesting of the quick-release fasteners is symbolized by the vertical dashed lines in FIGS. 4 and 9.

The position of the various guiding elements, in particular the under-neck guide 40, the body guide 52, the neck guide 62 and the lip guide 72, which is then set relative to the support plates 36 in order to adapt the dimensions of the slot 27 to the format of the preform 18. Thus, the under-neck guides 40 are set transversely in such a way that the slot 27 that is enclosed between them has a transverse dimension that is slightly greater than the under-neck diameter "D2" of the preform 18. Then, the body guides 52 are set so as to adapt the width of the slot 27 to the diameter "D3" of the body 20 of the preforms 18. The positions of the neck guides 62 are also set so as to adapt the transverse spacing thereof according to the outer diameter "D1" of the collar 24 of the preform 18. Finally, the position of the lip guide 72 is also set vertically and longitudinally above the guiding rails 38 according to the height "H" of the neck 22 of the preform 18.

When the position of each guiding element is set, it is immobilized in its set position by tightening of the clamping screws or of the corresponding clamping nuts.

Given that this operation is intended to be carried out just once, the clamping screws and the nuts comprise an imprint for cooperating with an adjustment key. Thus, in this case the adjustment operation requires the use of a tool. However, as a variant, the clamping screws comprise handles to permit manual, tool-free tightening.

When a change in the format of the preform 18 is desired, the segments of the guiding rail 38 and the lip guide 72 are removed from the frame 26 using the quick-release fasteners 82. The adjustable fastening means are not loosened. The abovementioned guiding elements remain in position, set relative to the support plates 36. The guiding elements are stored in their set position which is suitable for said preform format, until the next use of said format of preform 18.

When said format of preform 18 is once again processed, the guiding elements are once again mounted on the frame 26 via the support plates 36 using the quick-release fasteners 82. Thus, the guiding elements are already set for said format of preform 18. It is therefore not necessary to carry out the setting operation again.

Moreover, the use of quick-release fasteners 82 for fastening the support plates 36 to the frame 26 permits very quick replacement of the guiding elements.

Furthermore, dividing each guiding rail 38 into independent segments serves to facilitate the handling of the guiding elements when changing the format of the preform 18.

The invention claimed is:

1. A device (10) for supplying preforms (18), in particular preforms made of thermoplastic material intended to be shaped into containers, suitable for preforms (18) comprising a collar (24), the device (10) comprising a file-forming slide (16) for the preforms (18), comprising two sliding tracks (34) intended to support the preforms (18) upright by their collar (24), the slide (16) comprising:
a fixed frame (26);
elements for guiding the preforms (18), where the elements are mounted so as to be adjustable in terms of position on the frame (26) so as to be adapted to different formats of preform (18);
wherein the guiding elements are mounted so as to be adjustable on the frame by means of associated support plates (36), the support plates (36) being fixed in a reference position on the frame (26) by removable fastening means in order that the guiding elements can be detached from the frame (26) by removing the support plates (36) while keeping their adjustment in terms of position relative to the support plates (36).

2. The device (10) as claimed in claim 1, wherein the means for removable fastening of the support plates (36) on the frame (26) consist of quick-release fasteners (82).

3. The device (10) as claimed in claim 2, wherein the slide (16) comprises a slot (27) bounded transversely by two parallel guiding rails (38), each guiding rail (38) comprising an under-neck guide (40), forming one of said guiding elements, which comprises one of the tracks (34) for sliding, the under-neck guide (40) being mounted so as to be adjustable transversely on the support plate (36) by means of a first adjustable fastening means.

4. The device (10) as claimed in claim 3, wherein each guiding rail (38) comprises a body guide (52), forming one of said guiding elements, which is arranged below the under-neck guide (40) in order to guide a body (20) of the preforms (18) and which is mounted so as to be adjustable transversely on the under-neck guide (40) by means of second adjustable fastening means.

5. The device (10) as claimed in claim 4, wherein each guiding rail (38) comprises a neck guide (62), forming one of said guiding elements, which is arranged on the under-neck guide (40) in order to guide a neck (22) of the preforms (18) and which is mounted so as to be adjustable transversely on the under-neck guide (40) by means of third fastening means.

6. The device (10) as claimed in claim 5, wherein the device (10) also comprises at least one lip guide (72), forming one of said guiding elements, which is arranged in line with the slide (16) in order to hold the preforms (18) upright in the slide (16), the lip guide (72) being mounted so as to be adjustable vertically on support plates (36) by means of a fourth adjustable fastening means, the support plates (36) being fastened in a reference position on the frame (26) by means of quick-release fasteners (82).

7. The device (10) as claimed in claim 2, wherein the quick-release fasteners (82) are formed by nesting of complementary-shaped elements, comprising a ball locking mechanism (94).

8. The device (10) as claimed in claim 7, wherein ball locking mechanism comprises a pusher (100) for unlocking.

9. The device (10) as claimed in claim 2, wherein the quick-release fasteners (82) are formed by ball-and-socket mechanisms.

10. The device (10) as claimed in claim 2, wherein at least one of the adjustable fastening means is formed by a clamping screw (44, 58, 68) received in an adjustment port (46, 60, 70), the clamping screw (44, 58, 68) comprising an imprint for cooperating with an adjustment key.

11. The device (10) as claimed in claim 2, wherein each guiding rail (38) is formed of multiple independent segments (38A, 38B, 38C, 38D, 38E) which are each borne by associated support plates (36).

12. The device (10) as claimed in claim 4, wherein each guiding rail (38) comprises a neck guide (62), forming one of said guiding elements, which is arranged on the under-neck guide (40) in order to guide a neck (22) of the preforms (18) and which is mounted so as to be adjustable transversely on the under-neck guide (40) by means of a third fastening means.

13. The device (10) as claimed in claim 3, wherein the device (10) also comprises at least one lip guide (72), forming one of said guiding elements, which is arranged in line with the slide (16) in order to hold the preforms (18) upright in the slide (16), the lip guide (72) being mounted so as to be adjustable vertically on support plates (36) by means of a fourth adjustable fastening means, the support plates (36) being fastened in a reference position on the frame (26) by means of quick-release fasteners (82).

14. The device (10) as claimed in claim 4, wherein the device (10) also comprises at least one lip guide (72), forming one of said guiding elements, which is arranged in line with the slide (16) in order to hold the preforms (18) upright in the slide (16), the lip guide (72) being mounted so as to be adjustable vertically on support plates (36) by means of a fourth adjustable fastening means, the support plates (36) being fastened in a reference position on the frame (26) by means of quick-release fasteners (82).

15. The device (10) as claimed in claim 3, wherein the quick-release fasteners (82) are formed by nesting of complementary-shaped elements, comprising a ball locking mechanism (94).

16. The device (10) as claimed in claim 3, wherein the quick-release fasteners (82) are formed by ball-and-socket mechanisms.

17. The device (10) as claimed in claim 3, wherein at least one of the adjustable fastening means is formed by a clamping screw (44, 58, 68) received in an adjustment port (46, 60, 70), the clamping screw (44, 58, 68) comprising an imprint for cooperating with an adjustment key.

18. The device (10) as claimed in claim 4, wherein the quick-release fasteners (82) are formed by nesting of complementary-shaped elements, comprising a ball locking mechanism (94).

19. The device (10) as claimed in claim 4, wherein the quick-release fasteners (82) are formed by ball-and-socket mechanisms.

20. The device (10) as claimed in claim 4, wherein at least one of the adjustable fastening means is formed by a clamping screw (44, 58, 68) received in an adjustment port (46, 60, 70), the clamping screw (44, 58, 68) comprising an imprint for cooperating with an adjustment key.

* * * * *